H. M. BARBER.
CLUTCH.
APPLICATION FILED JUNE 24, 1908.

945,363.

Patented Jan. 4, 1910.

Witnesses:-

Inventor:-
Howard M. Barber
by attorneys

UNITED STATES PATENT OFFICE.

HOWARD M. BARBER, OF STONINGTON, CONNECTICUT, ASSIGNOR TO C. B. COTTRELL & SONS COMPANY, OF NEW YORK, N. Y., A CORPORATION OF NEW JERSEY.

CLUTCH.

945,363.

Specification of Letters Patent.   Patented Jan. 4, 1910.

Application filed June 24, 1908. Serial No. 440,155.

*To all whom it may concern:*

Be it known that I, HOWARD M. BARBER, a citizen of the United States, and resident of Stonington, in the county of New London and State of Connecticut, have invented a new and useful Improvement in Clutches, of which the following is a specification.

My invention relates to an improvement in clutches and has particularly for its object to provide means for adjusting the wedge or wedges which control the action of the expanding clutch section or sections so that the movement of the movable clutch member toward and away from the fixed clutch member need never be varied for insuring the proper locking and releasing of the two members.

A practical embodiment of my invention is represented in the accompanying drawings in which—

Figure 1:
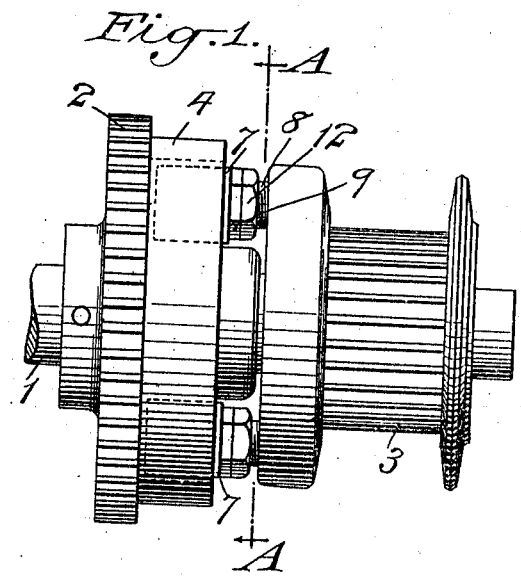
Figure 2:
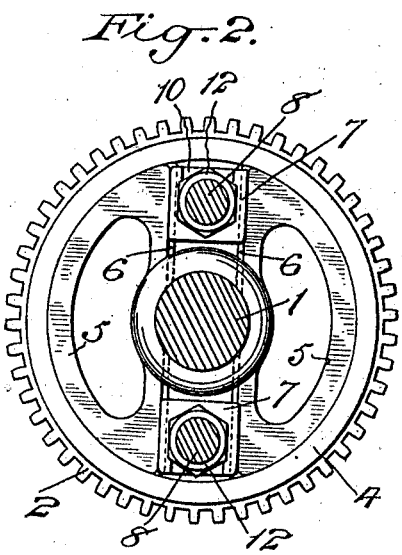
Figure 3:
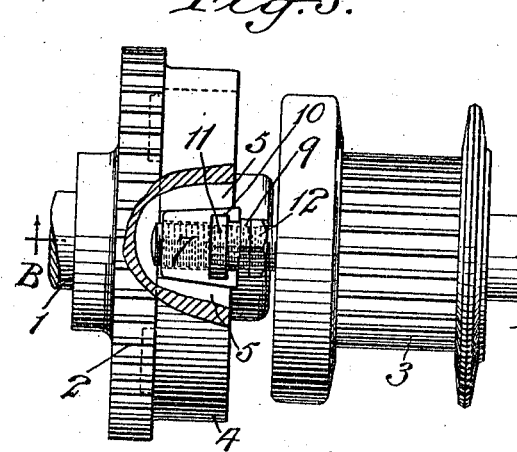
Figure 4:
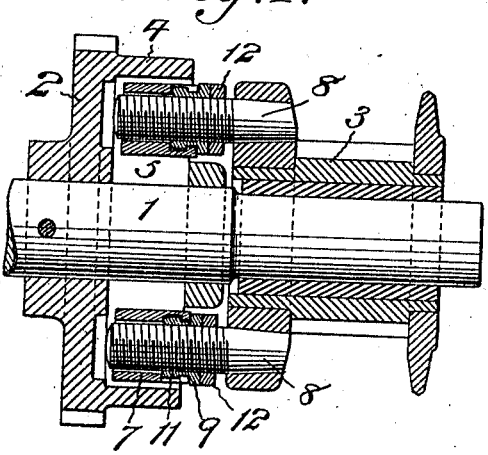
Figures 5, 6:
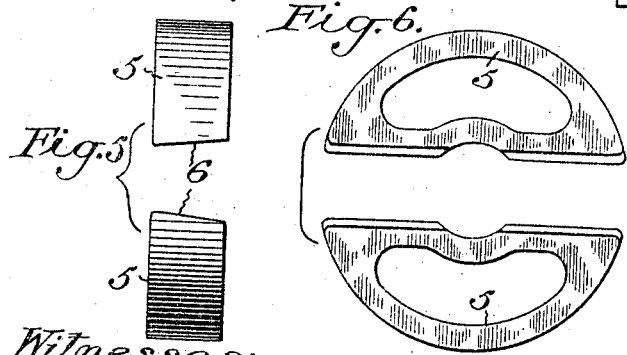
Figures 7, 8, 9:
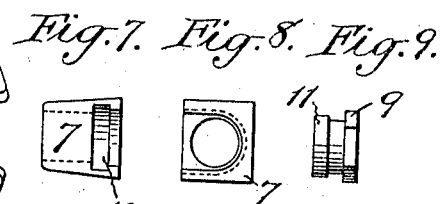

Figure 1 is an exterior view of the clutch, Fig. 2 is a section taken in the plane of the line A—A of Fig. 1, looking in the direction of the arrows, Fig. 3 is an exterior view of the clutch taken at right angles to Fig. 1, a portion of the fixed clutch member being broken away to more clearly show the engagement of one of the adjustable wedges with the expanding clutch sections, Fig. 4 is a longitudinal central section through the clutch taken in the plane of the line B—B of Fig. 3, looking in the direction of the arrows, Figs. 5 and 6 are detail edge and face views of the expanding clutch sections, Figs. 7 and 8 are detail plan and end views of one of the wedges, and Fig. 9 is a detail edge view of one of the wedge adjusting nuts.

The clutch herein shown is particularly well adapted for use in connection with rotary printing presses where the movable clutch member is provided with a master gear which can only have a predetermined lateral movement.

The rotary shaft to which the clutch member 2 is fixed, is denoted by 1. On this shaft the clutch member 3 may have a laterally sliding movement toward and away from the fixed clutch member 2. The fixed clutch member 2 is provided with a laterally extended annular flange 4, the inner cylindrical wall of which is arranged to be engaged and disengaged by one or more expanding clutch sections. In the present instance, I have shown two of these expanding clutch sections denoted by 5, which clutch sections are provided with cylindrical peripheral faces for engaging and disengaging the cylindrical inner wall of the annular flange 4. The opposite ends of these expanding sections 5 are tapered, as shown at 6, for receiving between them the adjustable wedges 7 carried by the movable clutch member 3, as follows: Screw studs 8 project laterally from the movable clutch member 3 and they are provided with nuts 9 which carry the wedges 7, as for instance by providing the wedges 7 with shouldered recesses 10 for receiving shouldered heads 11 on the said wedge adjusting nuts 9. Lock nuts 12 on said screw studs 8, serve to lock the wedge adjusting nuts 9 and the wedges carried thereby, in any required adjustment toward and away from the fixed clutch member 2.

In practice, after the range of movement of the movable clutch member 3 has been accurately adjusted, the wedges 7 may be adjusted so as to perform their locking and releasing functions in connection with the expanding sections, with the greatest accuracy and locked in such adjustment by the lock nuts 12. From time to time the wedges may be adjusted on their movable clutch members to account for wear on the expanding sections, without affecting the movement of the movable clutch member.

While I have shown this clutch as being provided with two diametrically opposed wedges and two expanding clutch sections, it is to be understood that one or more of these wedges and expanding clutch sections may be used as may be desired to suit different requirements.

It is evident that various changes might be resorted to in the construction, form and arrangement of the several parts without departing from the spirit and scope of my invention; hence I do not wish to limit myself to the structure herein set forth, but

What I claim is:

1. In an internal clutch, a fixed clutch member, a movable clutch member having a laterally sliding movement toward and away from the fixed clutch member and mechanism for locking and releasing the two members comprising an expanding section, a stud projecting laterally from the laterally sliding member, a wedge carried by said stud and means for adjusting the wedge thereon.

2. In an internal clutch, a fixed clutch member, a movable clutch member having a laterally sliding movement toward and away from the fixed clutch member and mechanism for locking and releasing the two members comprising an expanding section, studs projecting laterally from the said laterally sliding member, wedges carried by said studs and means for adjusting the wedges thereon.

3. In an internal clutch, a fixed clutch member, a movable clutch member having a laterally sliding movement toward and away from the fixed clutch member and mechanism for locking and releasing the two members comprising an expanding section, a stud projecting laterally from said laterally sliding member, a wedge carried by the stud, means for adjusting the wedge thereon and means for locking the wedge in its proper adjustment.

4. In an internal clutch, a fixed clutch member, a movable clutch member having a laterally sliding movement toward and away from the fixed clutch member and mechanism for locking and releasing the two members comprising an expanding section, studs projecting laterally from the said laterally sliding member, wedges carried by the studs, means for adjusting the wedges thereon, and means for locking the wedges in their proper adjustments.

5. In an internal clutch, a fixed clutch member, a movable clutch member having a laterally sliding movement toward and away from the fixed clutch member and mechanism for locking and releasing the two members comprising an expanding section arranged to engage and disengage the fixed clutch member, a screw stud projecting from the said laterally sliding clutch member, a nut engaging said stud and a wedge carried by said nut and engaging said expanding section.

6. In an internal clutch, a fixed clutch member, a movable clutch member and mechanism for locking and releasing the two members comprising expanding sections arranged to engage and disengage the fixed clutch member, screw studs projecting from the movable clutch member, nuts engaging said screw studs and wedges carried by said nuts and engaging said expanding sections.

7. In an internal clutch, a fixed clutch member, a movable clutch member having a laterally sliding movement toward and away from the fixed clutch member and mechanism for locking and releasing the two members comprising an expanding section arranged to engage and disengage the fixed clutch member, a screw stud projecting from the said laterally sliding clutch member, a nut engaging said stud, a wedge carried by said nut and engaging said expanding section and a lock nut on said screw stud.

8. In an internal clutch, a fixed clutch member, a movable clutch member and mechanism for locking and releasing the two members comprising expanding sections arranged to engage and disengage the fixed clutch member, screw studs projecting from the movable clutch member, nuts engaging said studs, wedges carried by said nuts and engaging said expanding sections and lock nuts on said studs.

In testimony, that I claim the foregoing as my invention, I have signed my name in presence of two witnesses, this twenty second day of June A. D. 1908.

HOWARD M. BARBER.

Witnesses:
A. R. STILLMAN,
G. BURDICK.